United States Patent [19]
Meltzer et al.

[11] Patent Number: 6,115,492
[45] Date of Patent: *Sep. 5, 2000

[54] MULTIPLE PURPOSE COMPOSITE TARGET FOR DIGITAL IMAGING TEST AND CALIBRATION

[75] Inventors: Robert B. Meltzer, Phoenix; Edward J. Bawolek, Chandler, both of Ariz.

[73] Assignee: Intel Corporation, Santa Clara, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 09/028,971

[22] Filed: Feb. 24, 1998

[51] Int. Cl.⁷ .................................................. G06K 9/00
[52] U.S. Cl. ............................................ 382/162; 382/287
[58] Field of Search ..................................... 382/162, 165, 382/167, 287; 348/94, 95

[56] References Cited

U.S. PATENT DOCUMENTS 5,150,199  9/1992  Shoemaker et al. ...................... 358/21
5,414,537  5/1995  Omuro et al. ........................... 358/518

*Primary Examiner*—Phuoc Tran
*Attorney, Agent, or Firm*—Blakely, Sokoloff, Taylor & Zafman LLP

[57] ABSTRACT

A method of making and using a target to verify an image from an imaging device is provided. A target is formed with a set of color patches that have numerically valued color characteristics. The color patches are repeated throughout the target as to permit verification of colors as a function of position of the color patches with respect to the target. A set of markers are provided to facilitate machine recognition of the target such that each position of the color patches may be referenced relative to the set of markers.

28 Claims, 4 Drawing Sheets

MULTIPLE PURPOSE COMPOSITE TARGET FOR DIGITAL IMAGING TEST AND CALIBRATION

BACKGROUND OF THE INVENTION (1) Field of the Invention

The present invention is generally related to verification and calibration of color as well as corrective adjustments for an imaging device.

(2) Background Information

Colors are part of our daily lives. However, for most people, there is no unit of measurement for color like there is for length or weight. For example, when we say that grass is green, dark green or light green, it is a matter of perception and subject to interpretation. In other words, people will draw different conclusions based on their experiences and use different words to express color. Therefore, the results can only be vague when describing a color using such terms as described above. Likewise, similar problems exist when verifying and calibrating color as detected by an imaging device based on visual perception.

One method to obtain precise color description would be to employ highly trained inspectors to control color on a production line and visually evaluate colors generated by the imaging device to determine if the colors are within an acceptable range. However, the problem with this approach is that the visual inspection is not based upon a set of objective criteria, but is based upon the experience of the inspector, which is subjective. Furthermore, this type of work is limited to those who have acquired years of experience to develop the visual skill. Another problem is that the evaluation may vary between inspectors because the perception of colors vary with age. Moreover, inspectors, being human, are subject to fatigue, which limits the number of inspections that could be done per inspector.

A better approach is to quantify colors such that colors are expressed numerically and thus could be analyzed by a machine with a high degree of accuracy. Many methods have been developed to quantify colors. Two of the methods are those developed by an international organization known as Commission Internationale de l'Eclairge (CIE). The first method is known as XYZ tristimulus valves and its associated Yxy color space. Color space is a term defining a method of numerically expressing a color of an object. XYZ tristimulus values are based on a concept that human vision perceives color by mixing three primary colors: red, green, and blue. XYZ tristimulus values are charted in three-dimensional space. $Y_{xy}$ color space is an aid to visualize the color defined by the tristimulus values XYZ by graphing the color in two-dimensional space.

The other method is known as L*a*b color space. Under L*a*b color space, L indicates lightness, while a and b indicates the chromaticity coordinates of a color in three-dimensional space. Stated differently, a and b indicate color directions, i.e. +a is the red direction, −a is the green direction, +b is the yellow direction, and −b is the blue direction. When L*a*b values for a color has been assigned, that color is numerically specific under the L*a*b color space.

Yet another method is the Munsell system. The Munsell system expresses color by using numerous color chips which are classified according to the color's hue, lightness, and saturation. Hue is the classification of shade of a color such as yellow, orange, red, purple, blue, and etc. Lightness is the classification of whether the color is dark or light. Saturation is the classification of whether the color is bright or dull.

A known prior art technique which has been utilized numerically expresses color to verify and calibrate color in charge coupled devices (CCDs). There, several color sheets with known numerical color values using the Munsell system are placed in front of a CCD device to be tested. The image of the color sheet is then taken by the CCD device and processed by a computer to determine if the color detected by the CCD device is within a predetermined tolerance level in comparison with the known color value placed in front of the CCD device. However, this approach is time-consuming since an image is taken for each individual sheet. Moreover, time is further consumed because other tests such as contrasts and signal to noise ratios are performed separately for color verification and calibration. In a production line, as an example, such time-consuming activities amount to unacceptable productivity loss. Accordingly, what is needed is a method of verifying and calibrating several colors simultaneously while providing a variety of additional tests at the same time.

SUMMARY OF THE INVENTION

The present invention provides a method of making a target to verify an image from an imaging device. A target is formed with a set of color patches that have numerically valued color characteristics. The color patches are repeated throughout the target as to permit verification of colors as a function of position of the color patches with respect to the target. A set of markers are provided to facilitate machine recognition of the target such that each position of the color patches may be referenced relative to the set of markers.

BRIEF DESCRIPTION OF THE DRAWINGS

The features, aspects, and advantages of the present invention will become more fully apparent from the following detailed Description, appended claims, and accompanying drawings in which:

DETAILED DESCRIPTION

In the following description, numerous specific details are set forth to provide a thorough understanding of the present invention. However, one having ordinary skill in the art should recognize that the invention may be practiced without these specific details. In some instances, well-known techniques have not been shown in detail to avoid obscuring the present invention.

Figure 1:
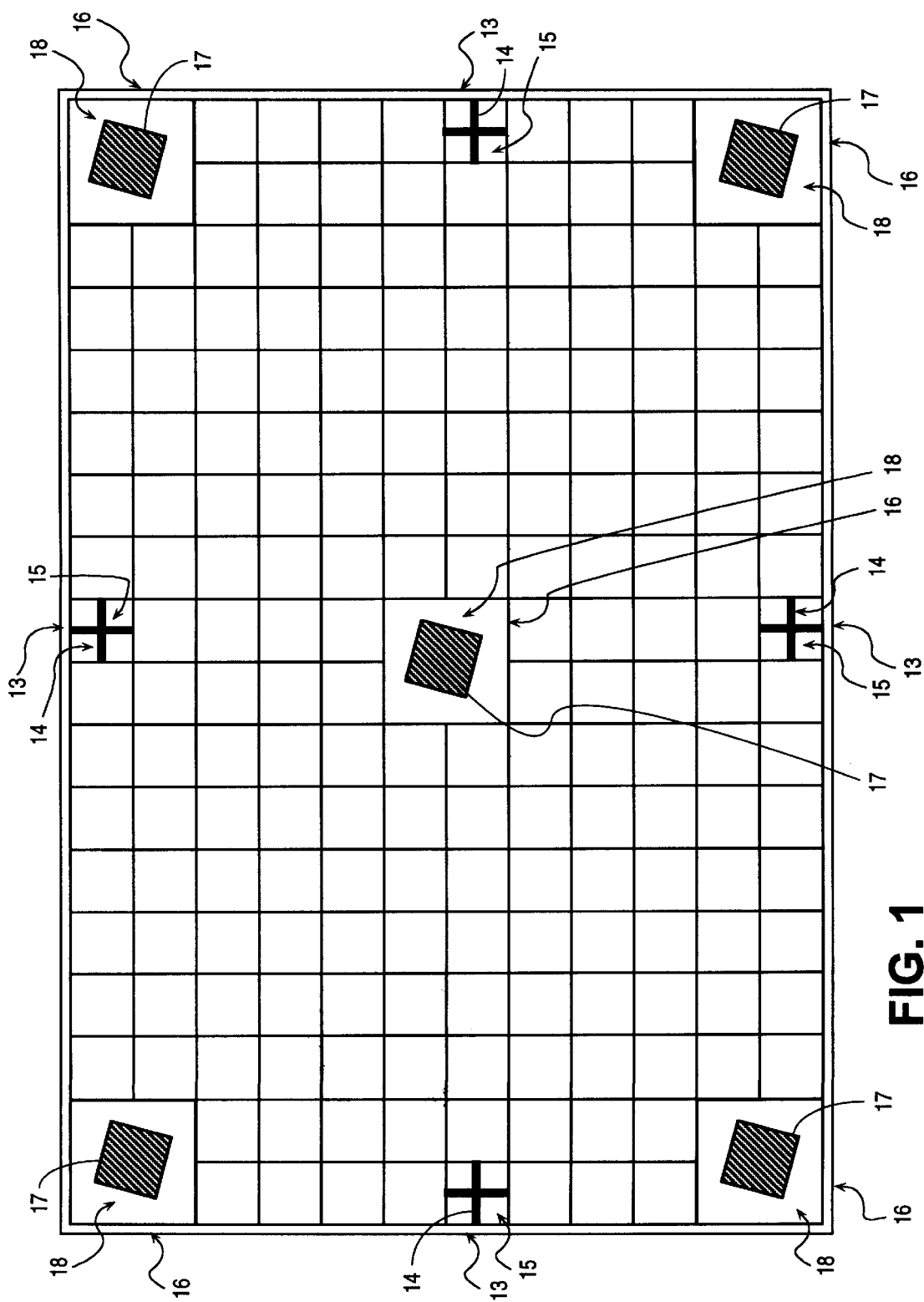
FIG. 1 illustrates an exemplary target of the present invention.

FIG. 1 illustrates an exemplary target of the present invention. Patches 11 of different colors are distributed through-out the image field of the target 10. Each color patch 11 is calibrated, by way of an example, according to the Munsell system. However, other color systems such as those developed by CIE may be used. In any event, the colors in the color patches should have numerical values that could be readily verified. In this instance, the color patches 11 correspond to a color set with known numeric values employed on the MacBeth ColorChecker® available from MacBeth/Kollmorgen Instruments Corporation in New Windsor, N.Y. The MacBeth ColorChecker® has eighteen color patches and six gray scale shade patches forming a 4×6 array matrix. In the target, nine similar MacBeth ColorCheckers® are combined to form a 12×16 matrix array. However, different patterns from that of the MacBeth ColorChecker® may be used. Moreover, substitute colors are permitted so long as they can be verified with a color numeric value.

Significantly, a color patch is repeated throughout the target 10 as to permit computation of color deviation as a function of position in the image field of the target. As an example, in using nine similar MacBeth ColorCheckers® to form a target 10 a particular color patch is dispersed to nine different locations in the target 10. In doing so, a selected color to be calibrated may be verified with respect to several positions in the image generated by an image device. This provides for verifying uniformity of the color throughout the image. From the result of the analysis, color can be calibrated to be within a predetermined tolerance level such that there would be no variation of the same color dependent on the location of the image field.

Additionally, to facilitate full field verification of the imaging device to be tested, all the color patches 11 are 2.1 units wide by 2.3 units high, based on the aspect ratio of the 971 PC digital camera kit available from Intel Corporation in Sunnyvale, Calif., the assignee of this invention. However, the dimension of the patches 11 may be varied in accordance with the aspect ratios of other imaging devices.

In order to facilitate machine vision and recognition of the positions of various color patches 11 in the target, target 10 includes a plurality of markers 13. However, one skilled in the art will recognize that markers to facilitate machine vision and recognition may be external to the target 10. By providing machine vision and recognition of the target 10, each color patch 11 can be referenced by an analyzing device 25 illustrated in FIG. 2 such as a computer. Each marker 13 is situated at the midpoint of each side of the target 10. Each marker comprises a crosshair 14 on a background 15. Each crosshair 14 is 0.3 units wide and is black corresponding to the Muncell color notation N2/. The background 15 of the marker 13 is white corresponding to the Muncell color notation N9.5/. Each marker 13 covers an area corresponding to one color patch. However, one skilled in the art will recognize that these are not the only positions or sizes in which the markers 13 may be used for machine vision and recognition, but that there may be other variations. Further, patterns other than crosshair may be used for machine vision and recognition in accordance with a desired result.

Target 10 further includes a plurality of contrast markers 16 are located at the target to test the focus of the imaging device. In this instance, the contrast markers 16 are located on each corner of the target 10 with one contrast marker 16 located at the center of the target 10. Each contrast marker 16 covers an area of 4 color patches. At the center of the contrast marker 16 is an off-axis square 17 with an area is equivalent to 2.1 units square. The square 17 is rotated clockwise by 10 degrees. The color of the square 17 is black corresponding to the Muncell color notation N2/. The contrast marker 16 also has a background 18 which is white corresponding to the Muncell color notation N9.5/. The black square 17 should be crisp such that the boundary between the square 17 and the white background 18 of the contrast marker 16 is sharp. If a light sensor array in the imaging device is properly aligned, the contrast of the 5 squares 16 should be sharp. If the light sensor array is misaligned, some of the squares 17 will be fuzzy on the black to white boundary of the contrast marker 17. One skilled in the art will recognize that these are not the only positions or sizes in which the contrast marker 17 may be used, but that there are other variations. Further, patterns other than off-axis square may be used in accordance with a desired result.

In addition, spatial frequency response (herein SFR) may also be tested using the above mentioned contrast markers 16. SFR is the response for the imaging device to change from black to white at the boundary between the black square and the white background. Typically, the change is gradual going from black to shades of gray to white which is more visible under magnification. SFR should be within an acceptable tolerance level. Should the SFR be out of tolerance, this is an indication that the tested imaging device is out of focus.

Turning to signal to noise ratio (herein SNR), SNR may be calculated by determining the mean value of the pixels corresponding to the image of a given color patch 11 along with its standard deviation (herein SD). The signal to noise ratio is calculated by using a known equation:

$$SNR = 20 \log_{10}(\text{mean value}/SD)$$

Again, SNR should be within an acceptable tolerance level. Should the SNR be out of tolerance, this is an indication that the tested image device is not properly filtering out the noise in a signal.

Linearity response of the imaging device may be determined using the gray scales of the MacBeth ColorChecker® in the target 10. In analyzing the responses of pixels in the light sensor array of the imaging device corresponding to white, gray scale and black patches of the MacBeth ColorChecker®, the responses should be linear. If the responses are curved, this is an indication that the responses of the pixels are not linear.

Figure 2:
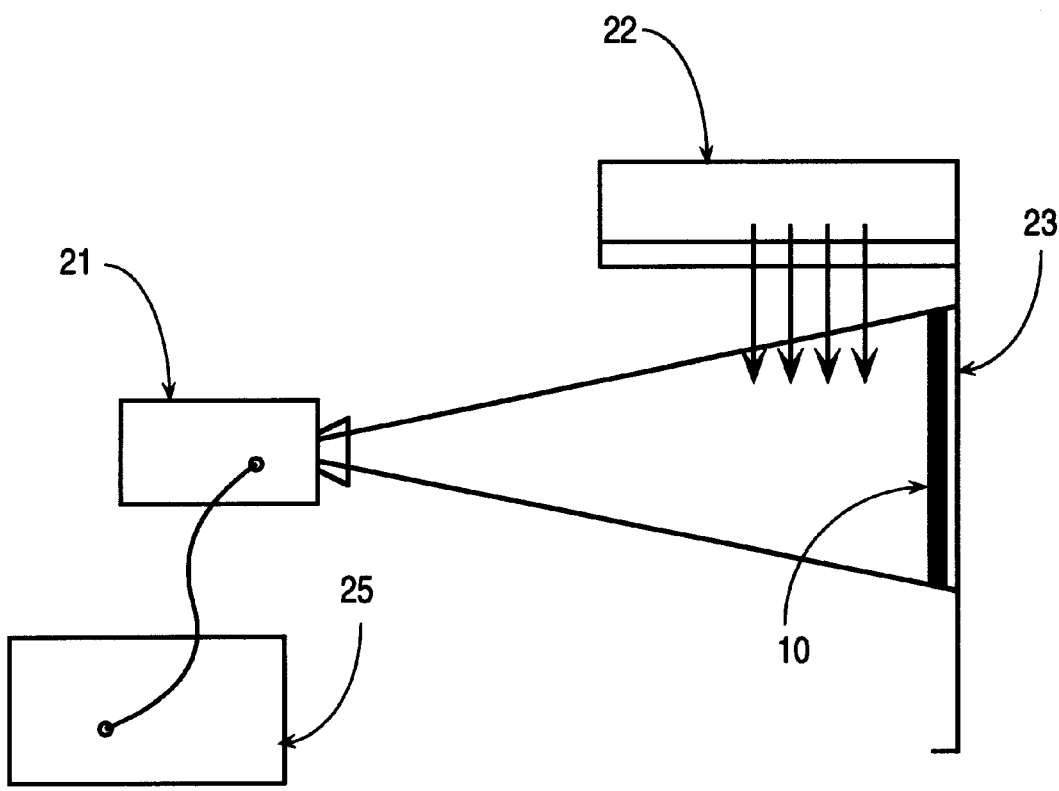
FIG. 2 illustrates an application of testing an imaging device using the exemplary target of the present invention.

Referring to FIG. 2, with the target 10 placed in the field of view of the imaging device 21 to be tested, an image of the target 10 is taken by the imaging device 21. The captured image of the target 10 is transmitted to the analyzing device 25 which scans for the location of the machine recognition markers 13 as illustrated in FIG. 1 to be used as reference points. Once markers 13 are detected from the image of target 10 the location of the color patches 11 are referenced relative to the location of the markers 13. In using the markers 13, the distance and position of the tested imaging device 21 with respect to the target 10 need not be known because the coordinates of the color patches 11 are relative to the markers 13 so long as the target 10 is within the field of view of the imaging device 21.

To provide uniform illumination of the color patches for uniform color matching when testing the image device 21, the target 10 is placed in a viewing booth 23 and is illuminated by a light source 22. It is generally known that different conditions of light affect how a color looks, for example, color under a fluorescent light will not look the same as the color under an incandescent light. While various light sources may be used, the present invention uses CIE D65 illumination source to illuminate the target 10. Commercial units are available such as The Judge® by MacBeth/Kollmorgen Instruments Corporation in New Windsor, N. Y. By comparing numeric color values of the image obtained from an imaging device, and the actual numeric color values of the color patches in the target, color verification is obtained.

Figure 3:
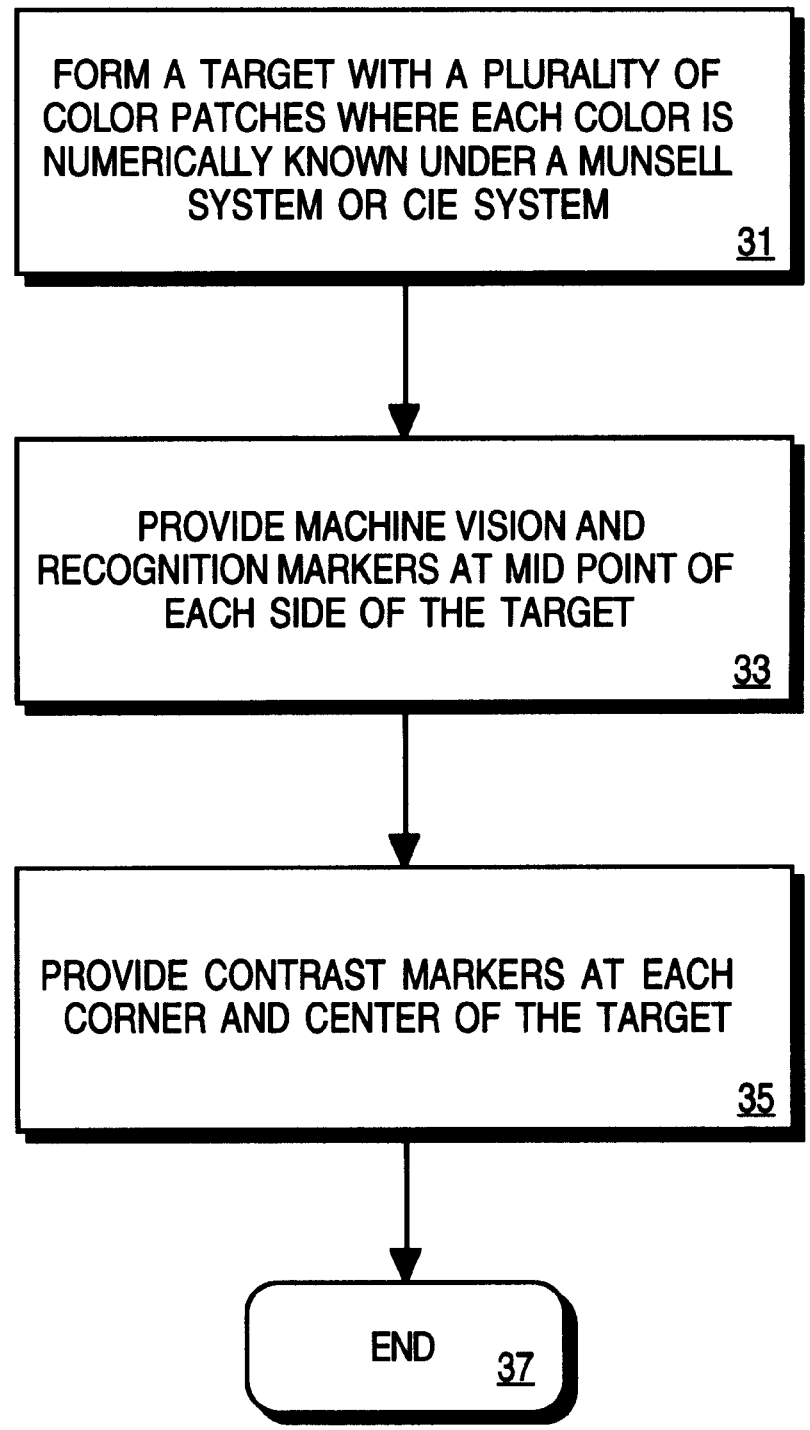
FIG. 3 illustrates an exemplary method of making an exemplary target of the present invention.
Figure 4:
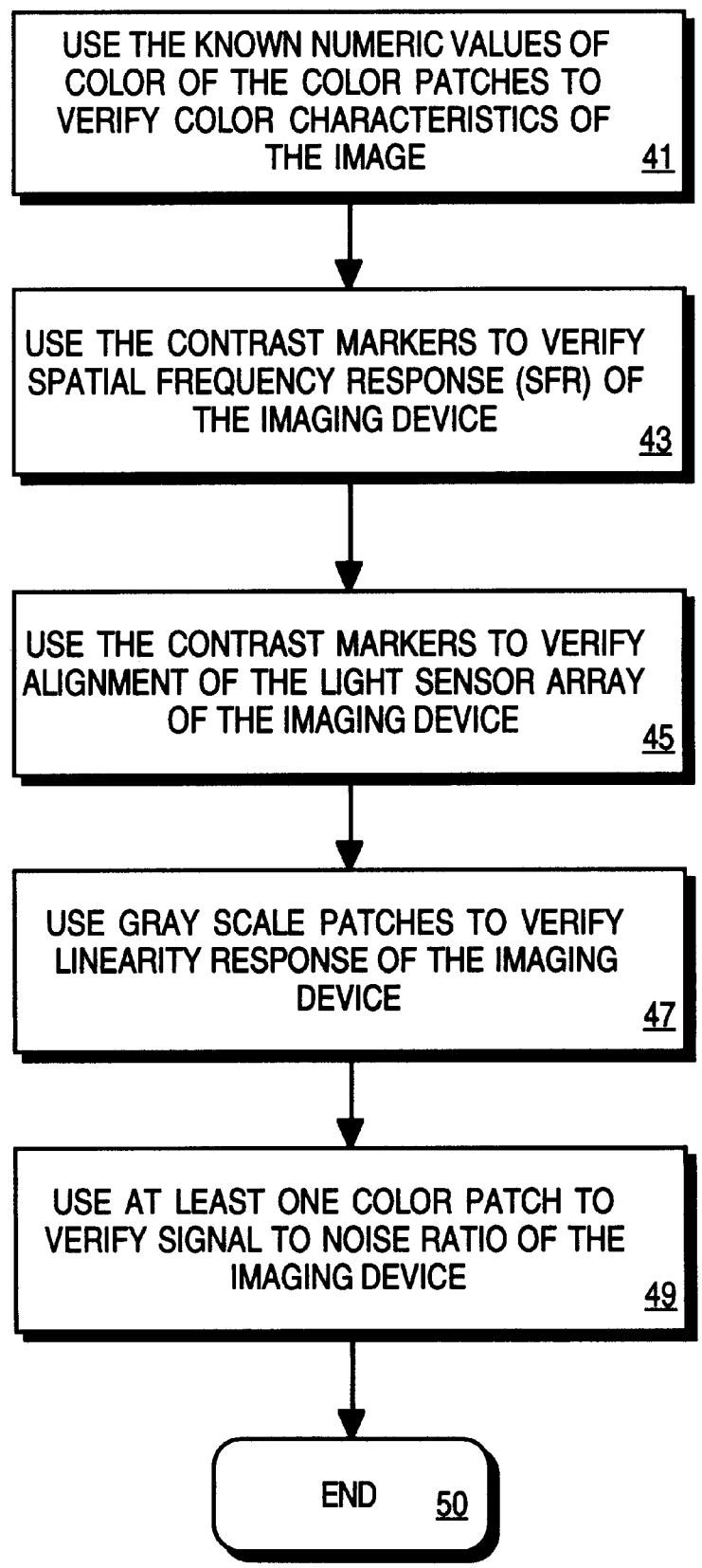
FIG. 4 illustrates an exemplary method of testing an image device by verifying an image generated by the imaging device using an exemplary target of the present invention.

Blocks 31 to 37 of FIG. 3 illustrate an exemplary method of making an exemplary target which is further described with respect to FIG. 1. Blocks 41 to 50 of FIG. 4 illustrates an exemplary method of testing an image device by verifying an image generated by the imaging device using the exemplary target of the present invention. The descriptions of blocks 41 to 50 are further referenced with respect to FIG. 1 and FIG. 2.

In the foregoing specification, the invention has been described with reference to specific embodiments thereof. It will however be evident that various modifications and changes can be made thereto without departing from the broader spirit and scope of the invention as set forth in the appended claims. The specification and drawings are, accordingly, to be regarded in an illustrative rather than a restrictive sense. Therefore, the scope of the invention should be limited only by the appended claims.

What is claimed is:

1. A method comprising:
   forming a target with a set of color patches wherein each of said patches has a color characteristic that is numerically valued and each of said patches are repeated throughout said target as to permit verification of colors as a function of position of said color patches with respect to said target; and
   forming a set of first markers to facilitate a machine recognition of said target such that each position of said color patches is referenced relative to said set of first markers.

2. The method according to claim 1, further comprising forming a set of second markers to verify focus of said imaging device.

3. The method according to claim 1, further comprising numerically valuing said set of color patches according to a Munsell color system.

4. The method according to claim 1, wherein the set of first markers are formed on said target.

5. The method according to claim 1, further comprising numerically valuing said set of color patches according to a L*a*b color space defined by CIE system.

6. The method according to claim 1, further comprising dimensioning said color patches according to an aspect ratio of said imaging device.

7. The method according to claim 1, wherein said set of color patches correspond with at least one MacBeth ColorChecker®.

8. The method of according to claim 1, wherein each of said first markers is a cross hair.

9. The method according to claim 2, wherein each of said second markers is an off-axis black square on white background.

10. The method according to claim 1, further comprising forming at least one set of gray scale patches on said target.

11. A method comprising:
    illuminating a target, said target having a set of color patches wherein each of said patches has a color characteristic that is numerically valued and each of said patches are repeated throughout said target as to permit verification of colors as a function of position of said color patches in an image of said target; and
    providing a set of first markers to facilitate a machine recognition of said target such that each position of said color patches are referenced relative to said set of first markers.

12. The method according to claim 11, further comprising verifying focus of an imaging device using a set of second markers.

13. The method according to claim 11, wherein the set of first markers are formed on said target.

14. The method according to claim 11, wherein said set of color patches are numerically valued according to tristimulus values XYZ defined by CIE system.

15. The method according to claim 11, wherein said set of color patches are numerically valued according to a L*a*b color space defined by CIE system.

16. The method according to claim 11, wherein said set of color patches correspond with at least one MacBeth ColorChecker®.

17. The method according to claim 11, further comprising verifying color characteristics of said image produced by said imaging device using said numerically valued color characteristics of said color patches.

18. The method of according to claim 11, wherein each said first markers is a cross hair.

19. The method according to claim 12, wherein each said second markers is an off-axis black square on white background.

20. The method according to claim 12 further comprising verifying a spatial frequency response of said imaging device using said set of second markers.

21. The method according to claim 11, further comprising verifying linearity response of said imaging device using at least one set of gray scale patches on said target.

22. The method according to claim 11, further comprising verifying a signal to noise ratio of said imaging device using at least one color patch.

23. An article of manufacture comprising:
    a target with a set of color patches wherein each of said patches has a color characteristic that is numerically valued and each of said patches are repeated throughout said target as to permit verification of colors as a function of position of said color patches with respect to said target, the target further having formed thereon a set of first markers to facilitate a machine recognition of said target such that each position of said color patches is referenced relative to said set of first markers.

24. The article of manufacture of claim 23 further comprising a set of second markers formed on the target to verify focus of an imaging device.

25. The article of manufacture of claim 23 further comprising a set of second markers formed on the target to verify a spatial frequency response of an imaging device.

26. The article of manufacture of claim 24 further comprising at least one set of gray scale patches formed on said target to verify linearity response of an imaging device.

27. The article of manufacture of claim 23 wherein the first markers are positioned along a periphery of the target.

28. The article of manufacture of claim 27 wherein each of the first markers includes a cross hair.

* * * * *

UNITED STATES PATENT AND TRADEMARK OFFICE
CERTIFICATE OF CORRECTION

PATENT NO. : 6,115,492
DATED : September 5, 2000
INVENTOR(S) : Meltzer et al.

Page 1 of 1

It is certified that error appears in the above-identified patent and that said Letters Patent is hereby corrected as shown below:

Column 6,
Lines 20-21, delete "each said" and insert -- each of said --.

Signed and Sealed this

Fourth Day of June, 2002

Attest:

Attesting Officer

JAMES E. ROGAN
Director of the United States Patent and Trademark Office